United States Patent [19]

Yates

[11] 4,270,297
[45] Jun. 2, 1981

[54] APPARATUS FOR ICE FISHING

[76] Inventor: Lance W. Yates, 6006 W. 29th St., Cicero, Ill. 60650

[21] Appl. No.: 134,934

[22] Filed: Mar. 28, 1980

[51] Int. Cl.³ ............................................ A01K 97/12
[52] U.S. Cl. ............................................. 43/4; 43/17
[58] Field of Search ...................... 43/17, 16, 15, 4, 4.5

[56] References Cited
U.S. PATENT DOCUMENTS

| 2,045,063 | 6/1936 | Baranowski | 43/16 |
| 2,198,286 | 4/1940 | Krivutza | 43/17 |
| 2,654,176 | 10/1953 | Kachelski | 43/17 |
| 2,970,400 | 2/1961 | Nolin | 43/17 |
| 3,984,935 | 10/1976 | Petersen | 43/17 |

Primary Examiner—Nicholas P. Godici
Attorney, Agent, or Firm—Edmond T. Patnaude

[57] ABSTRACT

There is described a system for ice fishing including a flexible tube filled with an antifreeze solution and through which a fish line extends, the tube being supported in a hole in the ice and the fish line extending through a trigger which releases a tip-up flag and actuates an electric lamp when the line is pulled down through the tube.

12 Claims, 6 Drawing Figures

U.S. Patent　　Jun. 2, 1981　　4,270,297
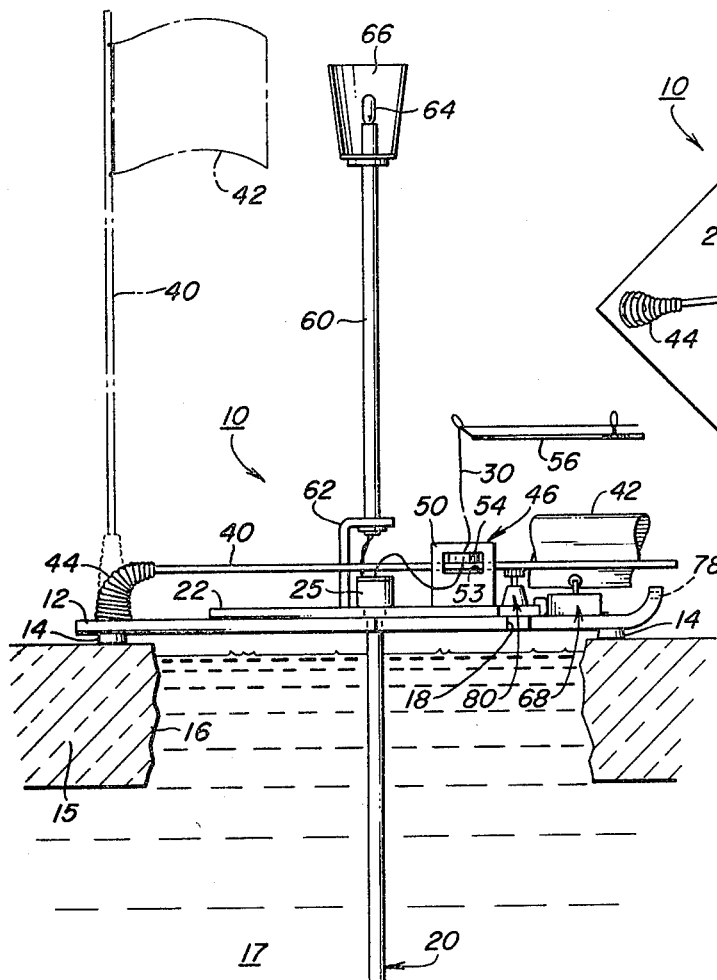
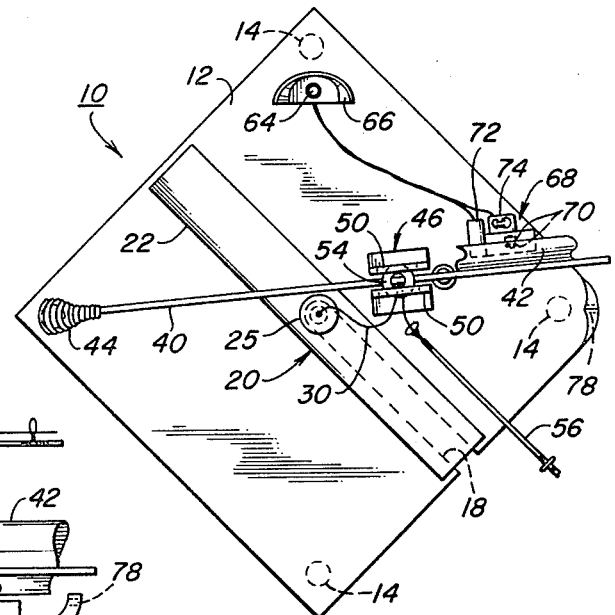
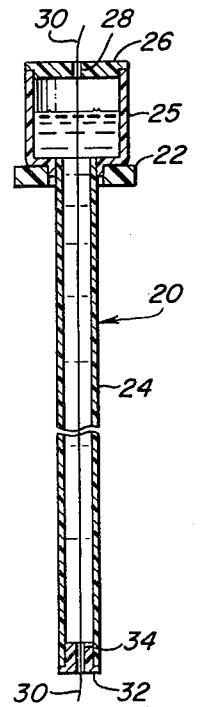
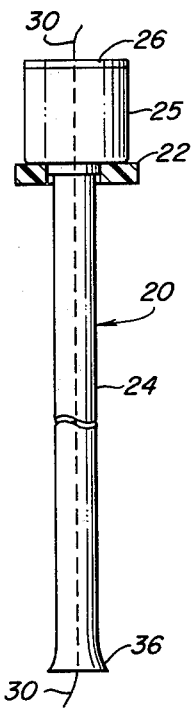
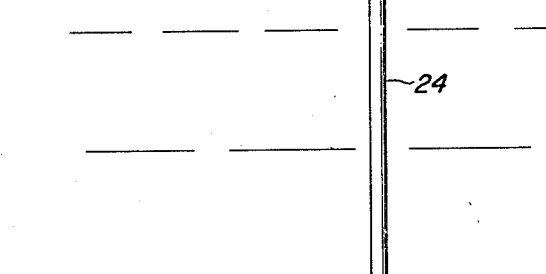
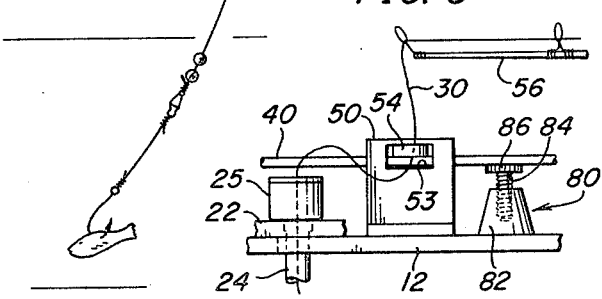
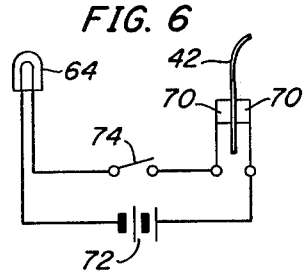

APPARATUS FOR ICE FISHING

The present invention relates in general to the art of ice fishing, and it relates in particular to novel methods and devices which prevent the water from freezing on the line and which permit the use of conventional rod, reel and line for ice fishing.

BACKGROUND OF THE INVENTION

The usual method of ice fishing entails the making of a hole through the ice and lowering a fish line and baited hook or lure through the hole into the water below the ice. Ordinarily a single fisherman will fish in more than one such hole and will use a tip up to signal when the line has been pulled down by a fish. When using a tip-up, the line is attached to a spool located in the water below the tip-up. When a fish pulls on the line the spool rotates to release the signal flag which swings up. One disadvantage of such tip-ups is that a rod and reel cannot be used, and moreover, relatively heavy fish line is required because of the difficulty in playing a fish without a rod and reel.

Another problem which commonly occurs during ice fishing is that the water in the hole freezes over and prevents the free movement of the line into and out of the water. Attempts to alleviate this problem have included the pouring of oil or other antifreeze liquid into the hole in the ice. However, this method pollutes the water and such antifreeze liquids do not remain within the hole for any appreciable length of time when the water surface level varies or when the antifreeze liquid is miscible with water.

Still another problem encountered by ice fishermen is that of line wear and breakage caused by the line dragging across the sharp edges of the ice as the fish pulls the line under the ice. This problem is particularly acute while fighting relatively large game fish.

SUMMARY OF THE INVENTION

Briefly, there is provided in accordance with the present invention a new and improved method and apparatus for use in ice fishing which eliminates the problems associated with freezing of the water in the ice hole to the fish line and enables the use of a conventional rod and reel with a tip-up.

In one of its aspects the invention provides a flexible tube having a reservoir at the top for containing a non-freezing liquid and through which the fish line depends into the water. Means are provided near the top of the tube for holding it in a substantially vertical position extending through the hole into the water.

Another aspect of the invention provides a novel tip-up mechanism which is released by a trigger mechanism directly actuated by a pull on the fish line. An adjustment means is provided for setting the tension on the line required to release the tip-up.

A further aspect of the invention provides an electric lamp and switch which provides a visible alarm when the tip-up is released.

GENERAL DESCRIPTION OF THE DRAWING

The present invention will be better understood by a reading of the following detailed description taken in connection with the accompanying drawing wherein:

FIG. 1 is a cross-sectional, elevational view of the system of the present invention being used for ice fishing;

FIG. 2 is a plan view of the system shown in FIG. 1;

FIG. 3 is a cross-sectional view of a preferred embodiment of the part of the system of FIG. 1 which prevents freeze up of the fish line;

FIG. 4 shows an alternative embodiment of the part of the system shown in FIG. 3;

FIG. 5 is an enlarged elevational view showing the tension adjustment mechanism; and FIG. 6 is an electric circuit diagram of the electric lamp signal feature of the system of FIG. 1.

DETAILED DESCRIPTION OF THE INVENTION

Referring particularly to FIGS. 1 and 2, an ice fishing system 10 comprises as its principal elements a plate 12 supported by a plurality of feet 14 on a layer of ice 15 over a hole 16 which has been cut from the ice to expose the water 17. The plate 12 may be translucent or opaque as desired. As best shown in FIG. 2, the member 12 is square in cross section although its particular shape is not critical as it may be circular or of some other desired shape. A slot 18 extends from one edge of the plate 12 to its approximate center. An antifreeze line guard assembly 20 includes an elongated realtively rigid support strip 22, which is adapted to rest on the upper face of the plate 12, and a flexible tube 24 is suitably secured as by bonding or by means of a press fit to the strip 22 and depends into the water 17 through the slot 18. The external diameter of the tube 24 is substantially less than the width of the slot 18 so that the support plate 22 and the tube 24 may be readily removed from the support plate 12 as will be explained more fully hereinafter.

A cup like reservoir 25 is secured to the tube 24 and above the strip 22 and includes a removable cover 26 having a small central hole 28 therein for loosely receiving a fish line 30. The tube 24 should have a relatively narrow internal dimension of, for example, ⅛th of an inch, and opens at the top into the reservoir chamber. A plug 32 is removably fitted into the lower end of the tube 24 and has a central hole 34 which is relatively small but freely receives the fish line 30.

In use, with the cap 26 removed the fish line 30 from the rod is threaded through the hole 28 and then through the tube 24. Thereafter the fish line is threaded through the plug 32 which is then inserted into the lower end of the tube 24. With the tube 24 in a vertical position a liquid, which is preferably lighter or less dense than water and which does not freeze at the temperatures to be encountered, is poured into the reservoir cup 26 to fill the tube 24. The person filling the tube may hold his finger over the hole 34 at the bottom during this procedure. Thereafter the tube 24 is placed into the water and the support strip 22 may be placed on the plate 12. The antifreeze line and guard assembly may be used independently of the plate 12 and the remainder of the system. In that case the strip 22 is simply placed across the hole 16. The strip 22 must have a length substantially greater than the diameter of the hole so as to support the tube at approximately the center of the hole. With the cap 26 and the plug 32 in place the nonfreezing liquid will remain in the tube substantially indefinitely since its only contact with the heavier water is through the small opening 34 at the bottom.

Because the tube 24 is flexible, if the line is pulled from the side by a fish the tube 24 will bend smoothly in the direction of the pull so that the line does not undergo any sharp bends as would be the case if the tube 20 were rigid and the line were pulled in a transverse direction. Also, the length of the tube 20 is selected so that the tube extends a substantial distance below the bottom of the ice layer wherefor it provides a guard for protecting the line from the sharp edges of the ice. In this regard, the tube 24 is preferably made of plastic which can be cut by the fisherman to the desired length.

FIG. 4 shows an alternative embodiment of the antifreeze and line guard assembly wherein the bottom of the tube 24 is flared out at 36 and the plug 32 is not used. While the embodiment of FIG. 4 does make it easier to thread a line through the tube 24, it has the disadvantage that a greater contact area is provided between the non-freezing liquid and the water whereby a greater loss of the nonfreezing liquid can occur during use of the system.

Again referring to FIGS. 1, 2 and 5, a signal flag pole 40 has a flag formed of plastic or the like 42 secured near the distal end thereof, and the other end is connected by a tapered coil spring 44 to the plate 12. The pole and flag are held in a substantially horizontal position by means of a releasable hold-down assembly 46 which responds to a downward pull on the fish line 30 to release the pole 40 so that it is swung into the vertical position shown in dotted lines at 48 in FIG. 1.

The assembly 46 includes a pair of upstanding flanges 50 which are spaced apart to permit the pole 40 to be freely moved therebetween and which are provided with aligned slots 53 which are adapted to receive a washer or the like 54 through which the line 30 is threaded. With the hole positioned in the space between the flanges 50 below the slots 53, the washer 54 is inserted therein, and having an outer diameter greater than the space between the flanges 50 holds the pole in the downward illustrated position. Preferably the line 30 then extends through the guides on a fishing rod 56 and onto a conventional fishing reel. When a fish pulls down on the line 30 the washer 54 is pulled out of the slot thereby releasing the pole 50 which swings up into the upper signaling position. The fisherman upon seeing the flag in the elevated position may then walk to the hole and slide the plate 12 out from under the support strip 22 which then rests on the ice across the hole. Using the rod and reel in the normal manner the fisherman may then play the fish through the tube 24 even though the surface of the water within the hole 16 may have frozen over.

In order to provide a signal which is visible in the dark for night fishing, a pole 60 is mounted by means of a bracket 62 to the plate 12. Preferably the pole 60 is manually rotatable on the bracket 62 so as to point an electric lamp 64 in a desired direction. A reflector 66 is mounted behind the flange 64 so as to enable the use of a lower intensity lamp. In order to energize the lamp 64 in response to a pull on the line 30, a switch assembly 68 which includes a pair of normally closed contacts 70 which are spring biased together, see FIG. 6. The contacts 70 are serially connected with the lamp 64, a switch 74 and a battery 72. The battery 72 may be a flashlight type battery or a transistor type battery depending upon the lamp 64 which is used.

With the flag pole in the horizontal position as shown in FIGS. 1 and 2, the plastic flag 42 is inserted between the contacts 70. The flag 42 is an insulator and therefore opens the circuit to the lamp 64. With the switch 74 closed, the lamp 64 will remain deenergized until the trigger 54 is pulled out of the slot 53 to release the pole 40 which, in swinging to the signaling position, pulls the flag 42 from between the contacts 70 which thereupon close to complete the circuit to the lamp 64 which then is energized and emits a visible alarm signal.

During use, the fishing pole 56 may be supported on a fishing pail or fishing box or the like but preferably the nose should be tipped slightly downward and should be positioned, as illustrated in FIG. 2, away from the pole 40 so that it may freely swing up into the signaling position.

As best shown in FIGS. 1 and 2 the corner of the plate 12 opposite the location of the spring 44 is bent upwardly and is provided with a hole 78 having an internal diameter substantially larger than the external diameter of the end portion of the pole 40. For storage purposes the end of the pole 40 may be inserted into the hole 78 thereby to hold the pole in a position generally parallel with the plate 12.

In order to adjust the tension which is required on the line 30 in order to release the pole, a tension adjustment device 80 is mounted to the plate 12 in proximity to the hold-down assembly. In FIG. 5 this adjuster is shown on the side of the hold-down assembly opposite the spring 44 but it could be disposed between the hold-down assembly and the spring 44 if desired. The tension adjustment includes a base member 82 secured to the plate 12 to threadably receive a screw 84 having a resilient disk 86 secured to the upper end thereof for pressing upwardly against the pole 40 when the pole is in the set position as shown in FIG. 2. As the screw 84 is threaded out of the hole in the base 82 to raise the member 86, the force required to pull the trigger washer 54 out of the slot 53 increases. In this way where certain types of live bait are used, the bait itself will not trigger the flag.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. Apparatus for use in fishing through a hole cut in a layer of ice overlying a body of water, comprising
  an elongated, narrow tube having openings at the top and bottom thereof,
  a fish line extending through said tube,
  said tube containing a liquid having a specific gravity and a freezing point substantially below the specific gravity and freezing points of said water, and
  support means supported by said layer of ice for holding said tube in said hole with the lower end submerged in said body of water and said upper end disposed above the surface of the water in said hole.

2. Apparatus according to claim 1 wherein
  said upper end of said tube is enlarged to provide a reservoir, and
  a cover is secured to said tube over said upper end, said cover having a small hole therein through which said fish line extends.

3. Apparatus according to claim 1 comprising
  an apertured plug removably secured to said tube over said opening at the bottom thereof,
  said line extending through said plug.

4. Apparatus according to claim 1 wherein said tube is flexible so as to bend in response to a transverse pull on said fish line.

5. Apparatus according to claim 1 comprising a plate adapted to rest on said ice and cover said hole,
said support means resting on said plate with said tube depending through an opening in said plate,
a signal pole,
spring means mounting said pole on said plate and urging said pole into an upright position,
hold-down means for holding said pole in a generally horizontal position and
trigger means connected to said line for actuating said hold-down means to release said pole in response to a pull on the line.

6. Apparatus according to claim 5 wherein said hold-down means comprises
an apertured upright member,
a trigger member movably supported by said member in the path of movement said pole between said generally horizontal position and said upright position,
and said fish line being connected to said trigger member for moving said trigger member out of said path.

7. Apparatus according to claim 6 comprising manually adjustable means for urging said pole against said trigger member.

8. Apparatus according to claim 5 wherein said trigger member is an apertured member and said fish line extends through said trigger member.

9. Apparatus according to claim 5 comprising
a flag attached to said pole,
said flag being formed of an insulating meaterial,
an electric lamp,
a battery,
a switch having a pair of contacts spring biased into mutually contacting relationship,
said lamp, said battery and said contacts being connected together in series,
said switch being mounted on said plate in proximity to said pole when said pole is in said generally horizontal position, and
said flag being positionable between said contacts,
whereby movement of said pole to said upright position removes said flag from between said contacts to cause the energization of said lamp.

10. Apparatus according to claim 5 wherein said plate is opaque.

11. Apparatus according to claim 5 wherein said opening in said plate comprises
a slot extending from the approximate center of said plate to one edge,
said tube being freely slidable along said slot for removing said tube and support means from said plate.

12. Apparatus according to claim 11 comprising a plurality of feet for supporting said plate on said ice.

* * * * *